June 12, 1945.　　A. A. CAMPBELL　　2,377,863
WINDOW
Filed Nov. 27, 1942

Inventor
Alvin A. Campbell
By C. E. Hevenstrom & H. E. Thibodeau
Attorneys

Patented June 12, 1945

2,377,863

UNITED STATES PATENT OFFICE 2,377,863

WINDOW

Alvin A. Campbell, Hackettstown, N. J.

Application November 27, 1942, Serial No. 467,123

2 Claims. (Cl. 20—40)

(Granted under the act of March 3, 1883; as amended April 30, 1928; 370 O. G. 757)

The invention described herein may be manufactured and used by or for the Government for governmental purposes, without the payment to me of any royalty thereon.

The present invention relates to a window through which operations, which involve or may involve an explosion, may be viewed with safety.

In manufacturing explosives and ammunition it becomes necessary at times to perform operations in which explosions may or do occur. In these instances a barricade is erected around the thing which will or may cause the explosion, or the fixture which holds it, or the thing or fixture may be brought within an already constructed barricade. In general a barricade may consist of an enclosing or surrounding wall, or housing, which acts as a shield between the operator or worker and the explosive thing or operation.

Such a barricade or shield may be made of steel of sufficient strength and thickness to protect the operator.

Windows have heretofore been placed in these barricades to enable the operator to see the operation or work within the barricade. The manner in which these windows have heretofore been constructed has not afforded adequate or complete safety to the operator in that explosions on occasions have ruptured or fragmented the lights or panes of glass nearest the operator, whereby the operator became subjected to flying fragments of glass. The object of the present invention is to provide a window which overcomes the above mentioned defect.

Figure 1:
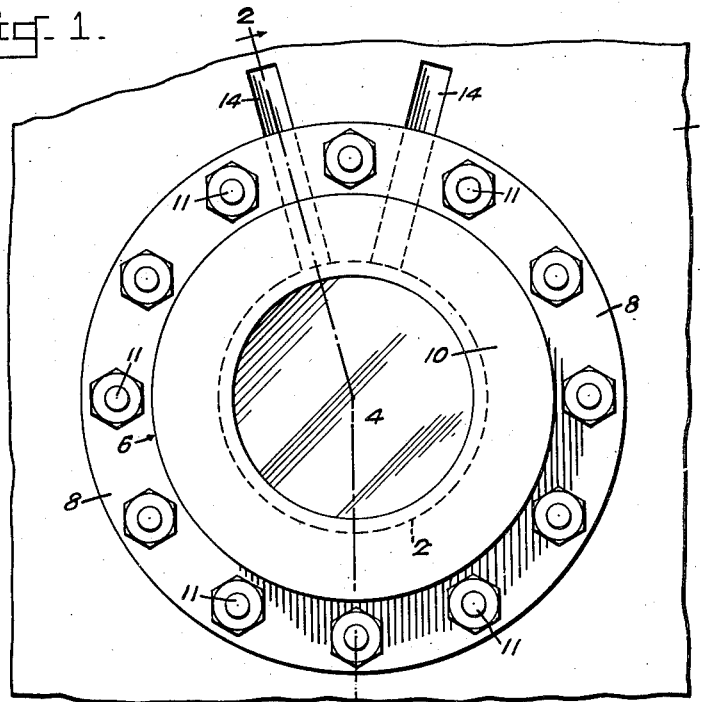

In the accompanying drawing which illustrates an embodiment of the invention, and in which the same reference numeral indicates the same part in the views, Figure 1 is an elevation of the window of the invention applied to the wall of a barricade, a part only of the wall being shown.

Figure 2:
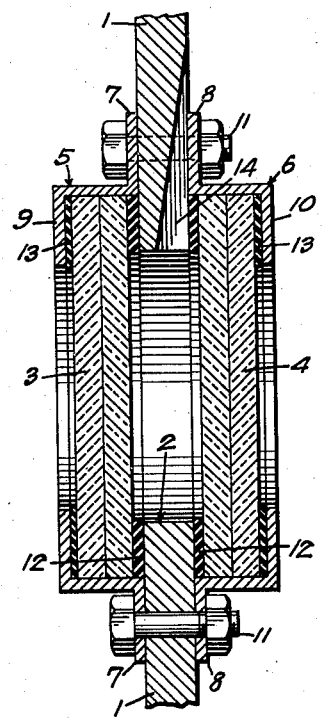

Figure 2 is a section on the line 2—2 of Figure 1.

Referring to the drawing, a barricade wall 1 of steel is provided to shield the operator from an explosive operation or to enclose the fixture or fixtures for explosive operations. An opening 2 is provided in this wall for the window. In the embodiment shown, this window is round, but it may be of any desired shape. Opening 2 is closed on each side of barricade wall 1 by means of circular transparent lights or panes of glass 3 and 4. These panes are preferably laminated safety glass as shown in the drawing. The pane 3 illustrates the one on the inside of the barricade, while pane 4 is the pane on the outside of the barricade.

Panes or lights 3 and 4 are held in position respectively by clamping rings 5 and 6. These clamping rings have respectively outwardly directed circular flanges 7 and 8, and inwardly directed flanges 9 and 10. Flanges 7 and 8 of the two clamping rings are secured to and against the barricade wall 1 by bolts 11 passing through holes in the flanges and barricade wall.

Rubber gaskets 12 are placed between the panes of safety glass and the barricade wall, and other rubber gaskets 13 are placed between the panes of glass and the flanges 9 and 10 of the clamping rings 5 and 6. When the bolts 11 are tightened the rubber gaskets cooperating with their contiguous parts form an airtight seal and holding means for the panes of glass.

It will be noted from an inspection of Figure 2, that an enclosed space exists between the two panes of glass, this space being defined by the circular wall of the hole 2 and the surfaces of the panes 3 and 4 nearest the barricade wall 1. When the window is assembled, air would normally be enclosed in this space and placed under some compression when the bolts 11 are tightened against the resiliency of the rubber gaskets. The present invention includes venting this space to the atmosphere, whereby any pressure arising in this space will be relieved through the vents. In the embodiment of the invention illustrated, two vents 14 are shown, and are made by milling two grooves on the outside of barricade wall 1 starting at the upper part of hole 2 to a depth of about five-eighths of the thickness of the wall and continuing upward at an angle so that the ends of the grooves extend further out from the edge of hole 2 than the periphery of flange 8.

Should a blow or explosion of sufficient intensity occur to fragment safety glass light 3, the aid which lies between the two lights of glass will, at the trasmission of pressure to light 3, be vented through vents 14 to the atmosphere, and the outer glass 4 will not fragment. If these vents were not supplied and a blow or explosion of great intensity occurred, the gasketed air cushion would transmit pressure to the outer glass light 4 causing fragmentation of that also with probable injury to an operator or personnel.

I claim:

1. A window comprising a permanent wall portion having an opening there through, a casing formed of two complementary clamping sections one on each side of and surrounding said opening and having continuous side flanges spaced from the wall portion with openings defined by said flanges opposite the opening in the wall portion, oppositely disposed external peripheral flanges on the casing sections for engagement with opposite sides of the wall portion, a pane of transparent material on each side of the wall portion and between the side flanges of the casing and said wall portion, and means for clamping the external flanges and thereby the panes to the wall portion, and a vent through the wall portion open to the atmosphere and communicating with the space between the panes.

2. The invention of claim 1 characterized in that there is a gasket of yielding material between the outer peripheral edge of the pane and side flanges of the casing, and also a gasket between the inner peripheral edge of the pane and the wall portion.

ALVIN A. CAMPBELL.